Figure 1:
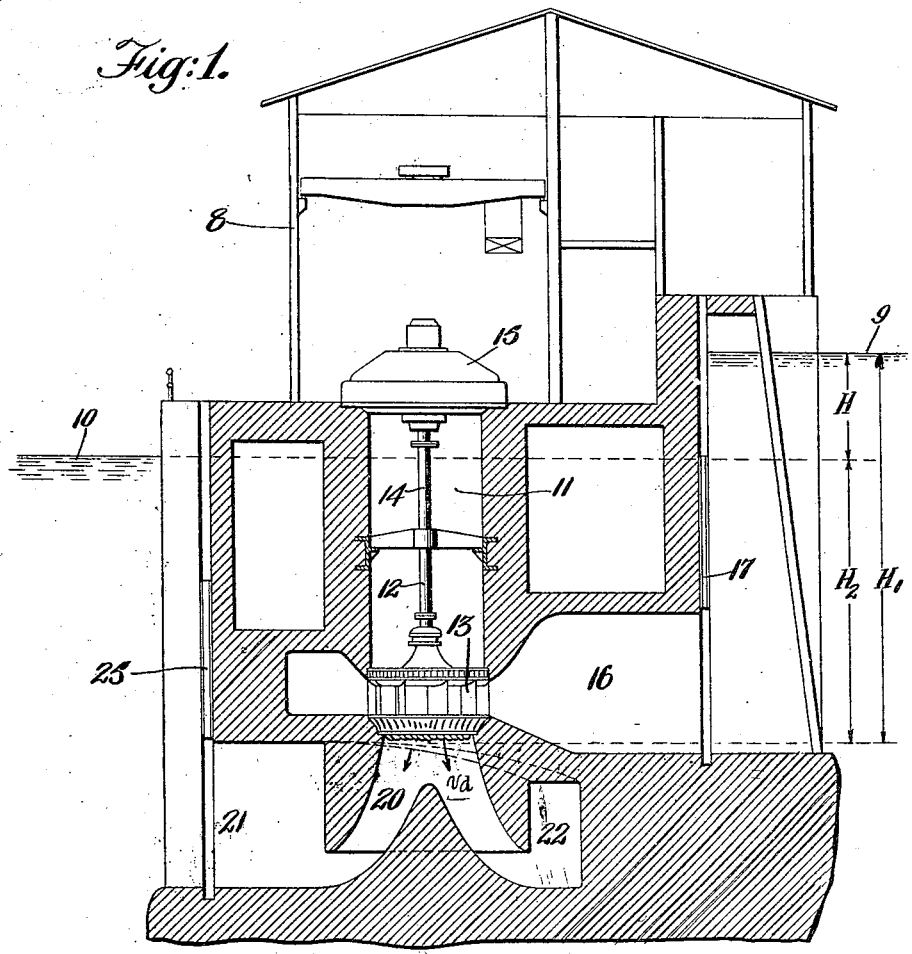

Aug. 21, 1928.

H. B. TAYLOR 1,681,711

HYDRAULIC POWER SYSTEM

Filed Dec. 4, 1919

5 Sheets-Sheet 1

Fig:1.

Inventor
Harvey Birchard Taylor
By Edwards, Sager & Bower
his Attorneys

Aug. 21, 1928.

H. B. TAYLOR 1,681,711

HYDRAULIC POWER SYSTEM

Filed Dec. 4, 1919 5 Sheets-Sheet 2

Aug. 21, 1928.

H. B. TAYLOR 1,681,711

HYDRAULIC POWER SYSTEM

Filed Dec. 4, 1919      5 Sheets-Sheet 4

Aug. 21, 1928.

H. B. TAYLOR 1,681,711

HYDRAULIC POWER SYSTEM

Filed Dec. 4, 1919    5 Sheets-Sheet 5

$N_{S_1}$ = Specific speed attainable by increasing outflow loss to take advantage of static discharge head  Ft. LB. System Inventor
Harvey Birchard Taylor
By his Attorneys
Edwards, Sager & Bower Patented Aug. 21, 1928.

1,681,711

UNITED STATES PATENT OFFICE.

HARVEY BIRCHARD TAYLOR, OF PHILADELPHIA, PENNSYLVANIA.

HYDRAULIC POWER SYSTEM.

Application filed December 4, 1919. Serial No. 342,383.

This invention relates to hydraulic power plants and particularly to such plants where the available water supply is under small and moderate heads. In such plants it is necessary to use a large flow of water to develop power in commercial quantity. In order to keep the turbines and power house required to handle these great quantities of water from being prohibitively large and expensive it is desirable to increase the velocity of the water as much as possible particularly where it passes through the turbines and at discharge from the runners; and in order to keep the electrical generators from being unduly large, it is desirable to obtain the highest possible rotary speed for the turbines. This high speed is also advantageous in making it possible to use standard electric machinery in many installations where otherwise large special machines would be necessary. When the velocity in the water passages is increased beyond a certain amount, however, the corresponding drop in pressure, according to hydraulic principles hereinafter explained, permits the pressure to approach the point at which the water will vaporize and if carried too far allows the continuity of the water column to be broken causing loss of head and danger of surges and other disturbances.
Even before actual break in the water column there will be danger of rapid corrosion of exposed metal surfaces so that a margin of safety must be allowed above the point of vaporization.
This is particularly the case at the turbine runners, where velocities are usually highest, and with turbines located as heretofore at a considerable elevation above the tail water there has been a limitation on the permissible velocity in the water passages which has so increased the size of the turbines for the power developed as to make the first cost of turbines and power house prohibitive.

The object of this invention is to provide a hydraulic power system for such low and moderate head conditions which will not require such large and expensive apparatus and in which high velocities of flow may be safely used without danger of interrupting the continuity of the water column. In the system of this invention reduction in pressure due to high velocity of flow is counteracted by a correspondingly high applied pressure head on the water particularly at the points of maximum velocity and, therefore, any velocity may be used within the limits of the opposing pressure head. To supply this opposing pressure head the turbines or other parts of maximum velocity are in the system of this invention placed at an elevation with respect to the level of the tail water corresponding to the desired velocity and the pressure head necessary to counterbalance the reduction in pressure resulting therefrom, departing from the customary practice of limiting the runner to positions above the tail-water level.

In the accompanying drawings illustrating specific applications of the principle of the invention,

Figure 2:
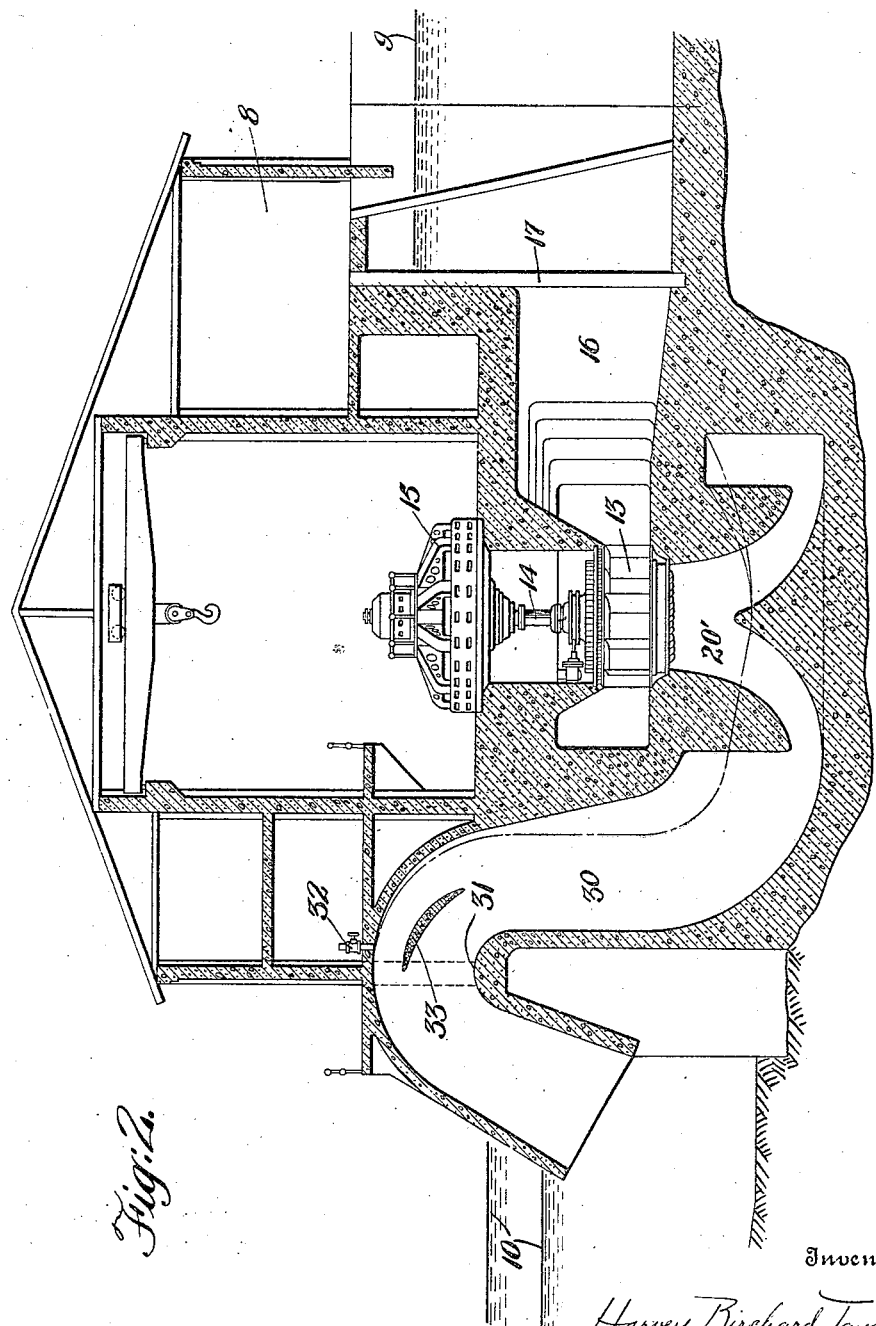
Figure 3:
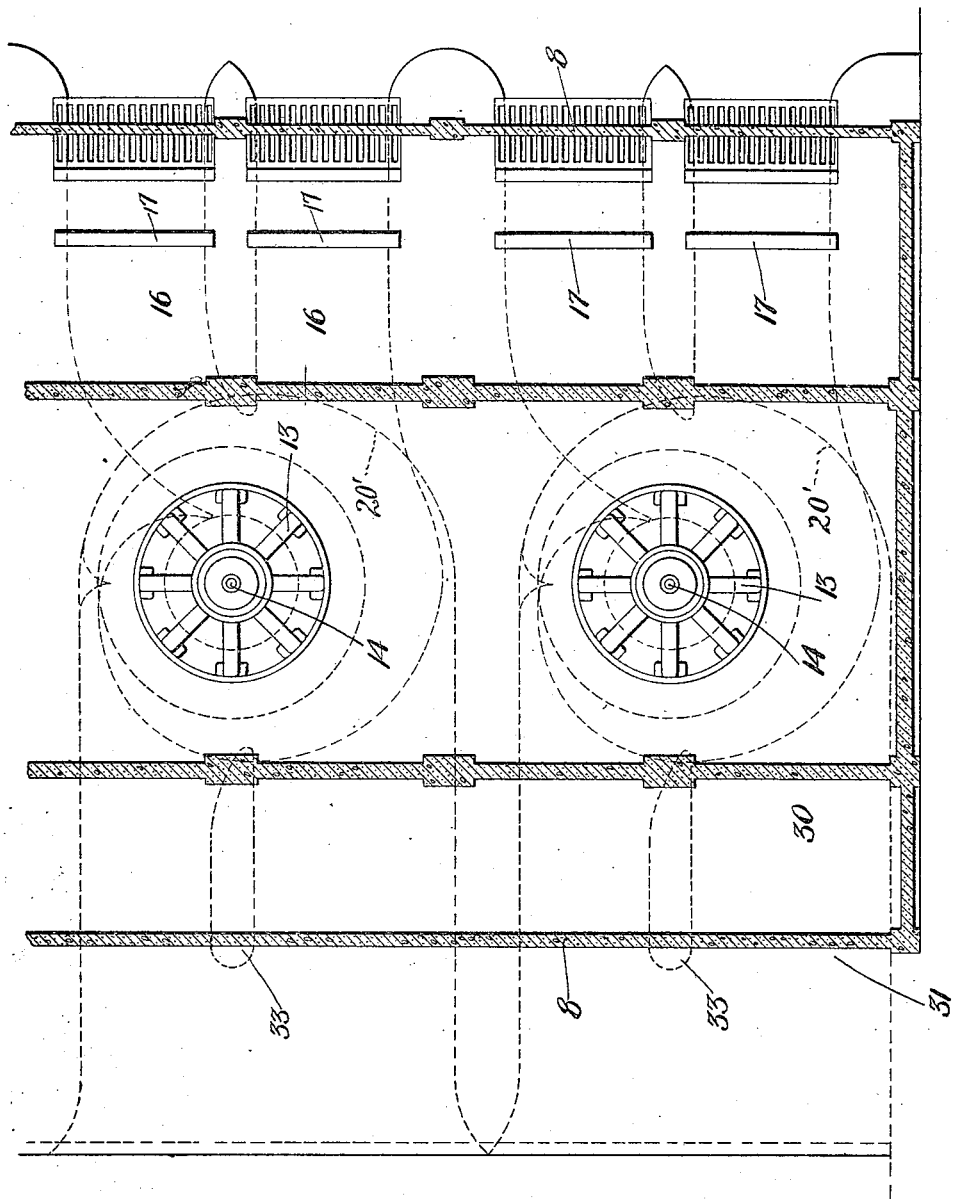
Figure 4:
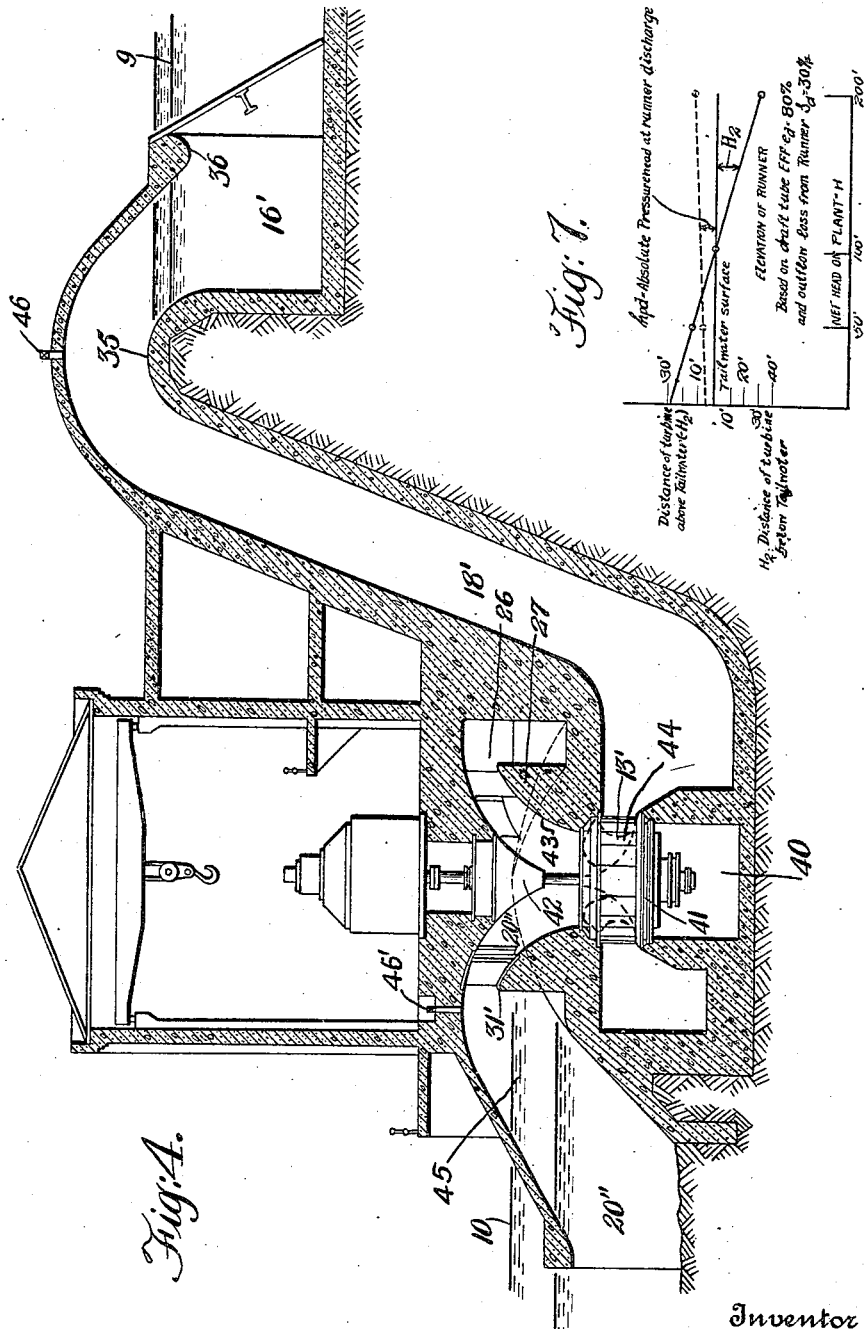
Figure 5:
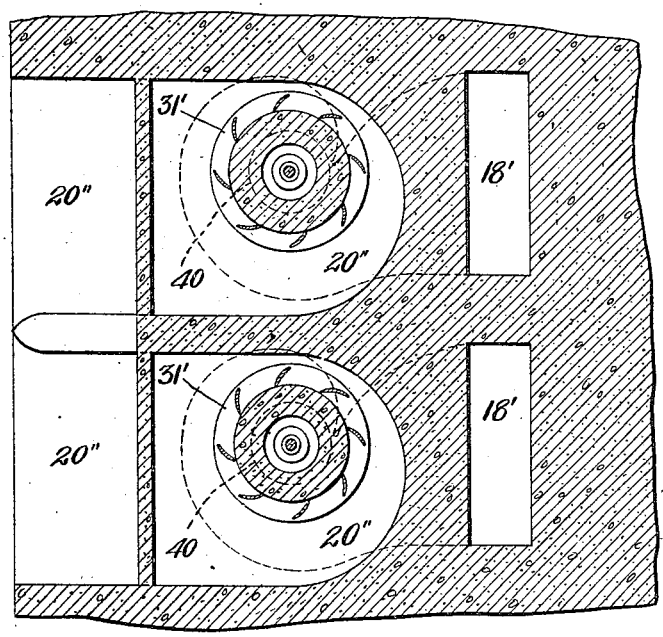
Figure 6:
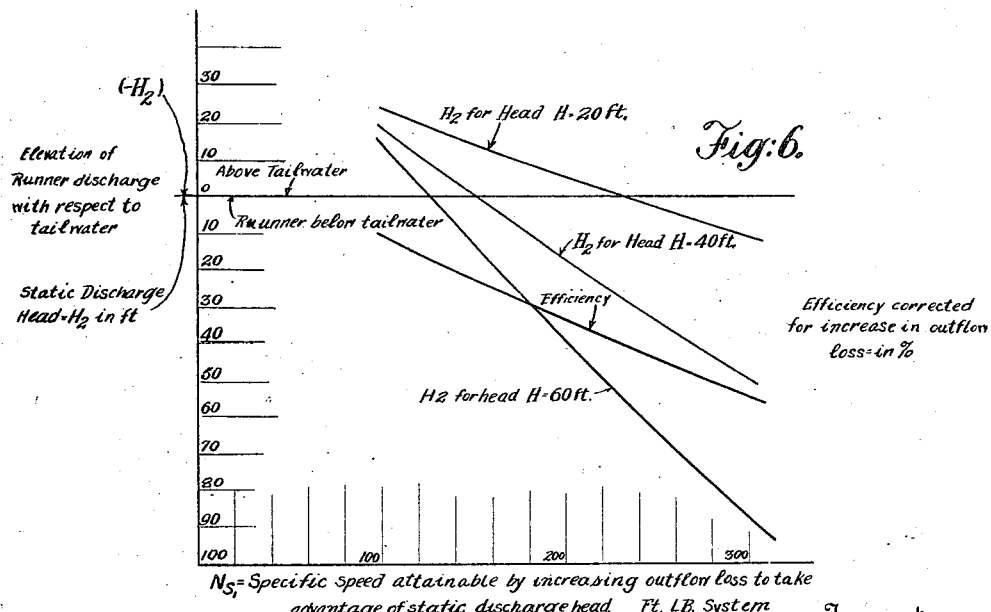

Fig. 1 is a vertical sectional view of a power plant showing one embodiment of the invention; Fig. 2 is a vertical sectional view of a modification; Fig. 3 is a plan view of the same; Fig. 4 is a vertical sectional view of a further modification; Fig. 5 is a partial plan view of the same, and Figs. 6 and 7 are diagrams illustrating the principles hereinafter explained.

In the embodiment of the invention illustrated in Fig. 1 a power house 8 has the head water 9 in the usual forebay or liquid basin on one side and tail water 10 in the usual forebay or liquid basin on the other. A vertical pit 11, is provided for the vertical shaft turbine 12 having a runner 13 below and shaft 14 driving generator 15 in the power house above. The inflow to the turbine runner is provided by passage 16 from head water 9 and controlled by gate 17 and at the runner this intake 16 has the form of a spiral or volute of progressively decreasing section delivering the water to the runner blades with a combined radial and circumferential flow. The turbine 13 is of the high speed type and is positioned below the level even of the tail race 10, and the supply head $H_1$ between the runner and the surface of the head water 9 is greater than the net head difference H between this head water and the tail race surface so that the water at the turbine is under relatively great static head; the absolute values of the hydraulic pressures being however determined by the conditions of flow and the effect of the relatively high velocities desired at these points. With the turbine runner under a certain initial head $H_1$ above the runner discharge, and having an absolute pressure $h_{pd}$ at the runner discharge then the head $H_t$ on the turbine proper, between intake and discharge, will be expressed by the following formula:

$$H_t = H_1 + h_{at} - h_{pd}; \quad (a)$$

where $h_{at}$ is the head corresponding to atmospheric pressure.

It is proposed according to this invention to place the runner at such an elevation (here assumed below tail water) that the turbine proper can operate under a head $H_t$ considerably greater than the head on the system H. To accomplish this, the velocity head at the runner discharge must be so related to the atmospheric pressure and the height of tailwater above the section that $h_{pd}$, the static pressure-head at the runner discharge, has a value safely in excess of that at which the water will tend to vaporize and the continuity of the water column in the draft tube will be in danger of being broken. The relation is as follows:

$$h_{pd} = H_2 + h_{at} - \frac{v_d^2}{2g} + L_2 + \frac{v_f^2}{2g} = H_2 + h_{at} - (1-\zeta)\frac{v_d^2}{2g}$$

or $$h_{pd} = H_2 + h_{at} - e_d \frac{v_d^2}{2g}; \quad (b)$$

Here $H_2$ denotes the height of tailwater above the runner discharge; $v_d$ denotes absolute velocity of discharge from the runner; $L_2$ the loss of head in the draft tube; $v_f$ the velocity of final discharge from the draft tube; $\zeta$ the percentage of velocity head lost in, and at final discharge from, the draft tube; and $e_d$ the efficiency of the draft tube. Hence:

$$\frac{v_d^2}{2g} = \frac{H_2 + h_{at} - h_{pd}}{e_d} \quad (c)$$

In well designed draft tubes $e_d$ can be assumed to be in the neighborhood of 75% in the case of large units. If $H_2$ and (consequently) $H_1$ are made large in comparison with H, and $\frac{v_d^2}{2g}$ increased in accordance with the above formula (keeping $h_{pd}$ within a range of say from 5 to 10 ft. as a proper margin, to allow for variations in velocity, etc.) then a value of $H_t$ can be secured considerably in excess of H.

If $N_s$ is the specific speed of a runner computed in the usual manner from the formula $$\left(N_s = N\frac{\sqrt{HP}}{H^{\frac{5}{4}}}\right),$$

in which HP is horsepower and if $H_t$ is the head on the turbine proper corresponding to the H upon which this value of $N_s$ is based, let $N_{s_t}$ be the $N_s$ for the turbine proper, based on $H_t$; that is:

$$H_t = H_1 + h_{at} - h_{pd} = H_1 + h_{at} - H_2 - h_{at} + e_d \frac{v_d^2}{2g} \text{ from } (a) \text{ and } (b)$$

or:

$$H_t = H + e_d \frac{v_d^2}{2g}; \quad (d)$$

and $$N_{s_t} = N\frac{\sqrt{HP}}{H_t^{\frac{5}{4}}} = N\frac{\sqrt{HP}}{\left(H + e_d\frac{v_d^2}{2g}\right)^{\frac{5}{4}}} = N\frac{\sqrt{HP}}{H^{\frac{5}{4}}\left(1 + e_d\frac{v_d^2}{2gH}\right)^{\frac{5}{4}}}$$

or $$N_{s_t} = \frac{N_s}{\left(1 + e_d\frac{v_d^2}{2gH}\right)^{\frac{5}{4}}} \quad (e)$$

In other words, in a turbine having a discharge velocity head from the runner of $\frac{v_d^2}{2gH}$ (sometimes called the "outflow loss", which we may denote by $\zeta_d$) expressed as a percentage of the head H ($\div 100$), and a draft tube efficiency of $e_d$, the specific speed of the turbine proper can be found from the specific speed of the complete turbine by dividing the latter by $(1+e_d\zeta_d)^{\frac{5}{4}}$. For example, in a turbine of 100 specific speed, having an outflow loss of 25%, and draft tube efficiency of 80%, the specific speed of the turbine proper would be:

$$N_{s_t} = \frac{N_s}{(1+e_d\zeta_d)^{\frac{5}{4}}} = \frac{100}{(1+.80\times.25)^{\frac{5}{4}}} = \frac{100}{(1.20)^{\frac{5}{4}}} = 80$$

Suppose now, that without altering H, the turbine is set at a low elevation compared to head and tailwater surfaces, under a head on the turbine proper $= H_{t_1}$, and the runner altered to give an increased discharge velocity in accordance with formula (c); the specific speed of the turbine proper, $N_{s_t}$, will remain the same, but the effective specific speed of the complete turbine will be $N_{s_1} = N_{s_t}(1 + e_d \zeta_{d_1})^{\frac{3}{4}}$, in which $\zeta_{d_1}$ is the new value of the outflow loss.

Continuing the above example, if the turbine of $80 N_{s_t}$ is placed 7 ft. below the surface of tailwater and is altered so as to increase its outflow loss to take advantage of this location, its outflow velocity head will be increased to $$\frac{v_{d_1}^2}{2_g} = \frac{H_2 + h_{at} - h_{pd}}{e_d} = \frac{7 + 34 - 6}{80} = 44 \text{ ft.,}$$

a value of $h_{pd}$ of 6 ft. being provided.

If the actual net head H on the system is 20 ft. the outflow loss will be $$\zeta_{d_1} = \frac{v_{d_1}^2}{2_g H} = \frac{44}{20} = 2.20 \ (220\%)$$

The specific speed of the complete turbine will then be:

$$N_{s_1} = N_{s_t}(1 + e_d \zeta_{d_1})^{\frac{3}{4}} = 80(1 + .80 \times 2.20)^{\frac{3}{4}} = 80(2.76)^{\frac{3}{4}} = 285.$$

The change in the location of the turbine, accompanied by the increase in the outflow loss which is thus permitted, has therefore made possible an increase in the specific speed from 100 to 285, which would give a corresponding increase in the actual speed of the unit.

It should be understood that the increase in specific speeds made possible by this method involve a certain sacrifice, which in this problem takes the form of a possible loss in efficiency. If a turbine having an original outflow loss of $\zeta_d$ and efficiency of $e$ is altered so as to increase its outflow loss to $\zeta_{d_1}$, the additional direct loss caused by this change will be $\zeta(\zeta_{d_1} - \zeta_d)H$. The new efficiency due to this will be:

$$e_1 = \frac{eH - \zeta(\zeta_{d_1} - \zeta_d)H}{H} = e - \zeta(\zeta_{d_1} - \zeta_d) \ \text{-----} \ (f)$$

It is probable that there will also as a rule be an accompanying increase in the other losses in the turbine, although this will not be as great. If all the losses increased in the same ratio as the outflow loss we should have:

$$(1 - e_1) = (1 - e)\frac{\zeta_{d_1}}{\zeta_d} \text{ or } e_1 = 1 - (1 - e)\frac{\zeta_{d_1}}{\zeta_d}.$$

The probable efficiency will lie between these limits, and it is believed will be close to the first value. It should be considered that with draft tubes of types recently introduced it is possible to regain the whirl components of velocity as well as the meridian components; this makes it possible to reduce the relative velocities at the runner discharge and to minimize the losses within the runner by giving the absolute discharge velocity a considerable whirl component. Moreover high speed turbines are continually being improved and higher efficiencies secured.

In the example just considered, the effect upon the efficiency of the great increase in speed which we have found to be possible will be as follows: Assuming the original efficiency of the 100 $N_s$ turbine to be 90%, and the efficiency of the draft tube to be 80% as already used, the increase in outflow loss from 25% to 220% will reduce the efficiency, due to draft-tube losses alone, to $$e_1 = e - \zeta(\zeta_{d_1} - \zeta_d) = .90 - .20(2.20 - .25) = .90 - .39 = .51; \text{ or } 51\%.$$

This result is largely dependent on the draft tube efficiency which it may be possible to realize. In the structure shown in Fig. 1 the turbine 13 discharges downward with axial and whirling motion and the draft tube 20 is designed to have the greatest possible efficiency in converting the velocity head at the runner discharge into pressure head at the outflow 21 into the tail race. Draft tube 20 is of the spreading conical type suited to runners of high specific speed since it regains efficiently the velocity head of both the axial and the whirl components. From draft tube 20 the water is collected by volute outlet 22 progressively increasing in cross section and further converting velocity head into pressure head at the outflow 21. With such a draft tube the expected efficiency of conversion may be as high as 90%. If this value is applied in the above example the efficiency resulting from an increase in outflow loss from 25% to 220% would be:

$$e_1 = .90 - .10(2.20 - .25) = .90 - .195 = .705 \text{ or } 70.5\%.$$

It may be pointed out that in the example discussed above a head on the plant of only 20 ft. was considered. The increase of head on the turbine proper consisted in this example largely of the atmospheric pressure, the distance at which the turbine was assumed to be placed below tailwater being only 7 ft. or just about sufficient to supply the absolute pressure head which has been provided at the point of discharge from the runner. If a case had been considered in which the net head on the plant had been higher it would have been found necessary to locate the turbine at an increased distance below the tailwater surface in order to realize any such increase in specific speed as was found possible in the example considered.

The relations expressed by the preceding formulæ may be more readily grasped if presented graphically. Figure 6 is therefore given for the purpose of showing the effect of the variations of some of the factors upon each other. This diagram is based on the same data as was assumed in the example given above, namely:

The specific speed of turbine proper, $N_{st}=80$
Turbine efficiency, $e=.90$
Draft tube efficiency $e_d=.80$
$\zeta=1-e_d=.20$
$\zeta_d=.25$
$h_{Pd}=6$ ft.
$h_{at}=34$ ft.

The curves plotted in the diagram show the manner of variation of the efficiency in relation to the specific speed when the specific speed is increased by increasing the outflow loss from the runner. The elevation at which the turbine must be placed with respect to tailwater in order to obtain the increased values of specific speed are shown for three different values of the net head H on the plant, namely, for 20, 40 and 60 ft. It will be noted, for example, that in order to obtain a specific speed of 167 when the net head on the plant is 60 ft. it will be necessary to depress the turbine 20 ft. below tailwater, and this increase in specific speed will reduce the efficiency to 75%.

With the turbine of this invention, the velocity of discharge from the turbine runner can be increased to the point where the pressure head against which the turbine is discharging is reduced to within a small margin of absolute zero, and the turbine will then operate under an effective head represented by the entire gross head on the intake side, including the atmospheric pressure acting on the head water surface. This head in low head plants may be several times the net head measured from head water to tail water so that the turbine can be operated at a speed corresponding to the gross intake head, and will be correspondingly reduced in dimensions and cost and the electrical generator or other driven machine also reduced in size and cost.

In the system shown in Fig. 1 a discharge gate 25 may be closed to exclude the tail race water 10 and with the inflow gate 17 also closed the turbine passages may be pumped out to give clear access to the turbine parts.

In the modification of the invention shown in Fig. 2 the draft tube 20' is continued in a vertical passage 30 which curves in a vertical plane to pass over a crest 31 which is placed at an elevation slightly higher than the maximum tailwater elevation. The tube then passes downward and is completely enclosed to a depth slightly below the lowest tailwater elevation to which the plant would be subjected. The passage thus formed will act as a siphon enabling the turbine discharge to take place below the tailwater surface while at the same time providing a protecting wall or crest to protect the turbine from submergence by tailwater whenever the siphon and draft tube passages are unwatered. This unwatering would be effected by shutting down the turbine, closing the head gates 17, admitting air to the top of the siphon through the air valve 32, and pumping out the water in the draft tube to a point sufficiently beneath the turbine to provide convenient access. The air valve 32 at the top of the siphon can also be used for the attachment of a hydraulic ejector or pump to draw out any air which may collect at that point during operation. It is, however, proposed in general to provide sufficient velocities in the draft tube to sweep out any air which might have a tendency to collect. A curved baffle plate 33 is shown which may be used if necessary to increase the local velocities at the top of the tube at the point where air is most likely to collect.

In the modification shown in Fig. 4, the turbine 13' is inverted and the discharge placed above the lower end of the intake 18'. The draft tube 20'' decelerating the outflow from the runner or rotor 44 is also of the spreading type comprising a continuous wall or trumpet-shaped casing 43 extending at its lower end around the rotor 44 and continuing upward along flaring lines to the crest 31' extending above the level of the liquid in the tailwater basin to permit drainage of liquid from the conduit within the wall 43 without permitting flow of liquid from said basin into said conduit. This wall 43 forms an open vertical flow decelerating conduit within the lower end of which is the rotor 44 so that the conduit communicates with the top of said rotor 44, and this form of draft tube is particularly advantageous in forming a natural crest 31' at the merging of the spread into the spiral thus easily adapting the tube for siphon use as shown. In this Fig. 4 modification the inlet passages 16' are also formed as a siphon having a crest 35 and end 36 submerged in the head water 9, so that gates and their operating expenses and usual leakage are dispensed with altogether. The intake 16', 18' and the passage through the rotor 44 and the draft tube 20'' form a conduit connecting the headwater basin to the tailwater basin and at 35 extending entirely above the upper or headwater basin. The upward discharge of this Fig. 4 form is directly opposite to the universal practice with turbines of the modern single runner vertical shaft type. It offers, however, many advantages over the downward discharge arrangement. When a turbine is equipped with a draft tube of the spreading or spiral type, such as has been shown in Figures 1 and 2, it will be noted that the draft tube discharges through a narrow cylindrical opening 26 at the end of the flaring section adjacent to the runner, and this opening 26 in the modification shown in Fig. 4 forms a sealed annular conduit directed toward the axis of the runner above the top of the wall 43. This portion of the tube is surrounded by a barrel 27 which when the turbine is inverted serves as a natural wall to prevent the entrance of tailwater, and the crest 31' formed by the discharge end of this barrel can be made to serve as the crest of a siphon. Referring to Figure 4 which shows a vertical cross-section through a power house arranged in this manner, it will be noted that when the tailwater is at its maximum elevation, it rises in the chamber 45 and surrounds the draft tube barrel, without overtopping the crest formed by the end of this barrel. The chamber 45 extends laterally from the axis of the turbine and beyond the wall 43 into the downwardly directed outlet of the draft tube 20''. It should also be noted that the height of the upper wall of the draft tube siphon at its highest point may be made a minimum distance above the tailwater surface, since this discharge space from the spreading portion of the draft tube is of very small width. This is due to the great length which can be used for this discharge space, namely, the complete circumference of the barrel, and to the comparatively high velocity which can be employed at this point. With this inverted arrangement of turbine the power house substructure can be reduced to small dimensions, and the cost of the structure is made small. In the arrangement shown in Figure 4, a tunnel 40 is provided beneath the power house running lengthwise of the power house beneath all the turbines, for the purpose of providing access to the turbine head covers, operating mechanism and shaft bearings. By means of this tunnel the working parts of the turbine can be readily removed for replacement or repair and the mechanism can be inspected during operation.

In order to start the turbine, an ejector or exhaust pump or blower would be connected to the pipe 46 shown at the crest of the intake siphon by means of which the air would be removed and water made to fill the passage. In order to shut down the plant, air would be admitted through the same connection. Both in this arrangement of turbine and that shown in Figures 2 and 3 the turbine can be started in operation without exhausting air from the draft tube siphon or if necessary air may be exhausted by the pipe connection 46' at the top of said siphon, although under either method as soon as water is admitted on the intake side of the turbine it will be under a sufficient head to rise above the crest of the draft tube siphon. During the operation of the rotor 44 the tailwater basin will be in communication with the extremity of the conduit within the wall 43 by siphon action, the sealed chamber 26, 45 being then filled with water. In the arrangement of Fig. 4, the velocity of water at the highest point of the draft tube siphon will be sufficient to sweep out any air which might tend to collect at this point, and in general no additional provision need be made for getting rid of air accumulation in the draft tube. In the arrangement of turbine shown in Figure 4 a guide bearing 41 for the main shaft is provided just below the runner and a second guide bearing 42 at a point about midway between this bearing and the generator bearing. This intermediate bearing is accessible from above from the pit shown just below the generator.

It will be noted that the intake siphon is designed to take care of the variation of head water level in the same manner as has been described with reference to the draft tube siphon. It is necessary that the upper wall of the intake be carried far enough below the low headwater level to guard against the drawing of air into the intake. The danger of drawing in air may be reduced by careful design of the intake passage so as to avoid sudden changes of the direction or velocity of flow and the avoidance of local eddies or vortices.

In some cases where it may be considered desirable in order to reduce the cost the tunnel beneath the turbines may be omitted and submerged operating mechanism and shaft bearing be used. For such an arrangement the plunger type of gate may be of advantage, since it has no small moving parts to get out of order.

It should be pointed out that the inversion of the single runner vertical shaft turbine is called for by considerations independent of the use of a siphon draft tube. By inverting the turbine and draft tube the elevations of the runner and of the draft tube discharge are interchanged, so that without increasing the depth of substructure of a power house, the runner can be placed near the bottom of the substructure and the space above utilized for the draft tube. For example, instead of placing the runner at an elevation such as that of the crest level 31', Fig. 4, and placing the draft tube discharge at the bottom of the substructure as in the usual arrangement, the runner is placed below at elevation 13' or even lower if necessary, and the draft tube discharge is placed above at 31'. This enables the runner to be readily located at a considerable distance below the tailwater surface, so that the advantages of this invention can be realized, without involving any increase in excavation required for the plant.

Even in plants where the runner is placed above the level of the tailwater this inversion of the turbine will permit the runner to be placed at the lowest available elevation. The principles of this invention may also be applied to a multi-runner turbine, but when the runners are of duplicate design as is in general the case, the distance $H_2$ of this theory must apply to the highest runner of the set. In other words, the speed at which the unit can operate is limited by the location of the highest runner. Since the runners must all operate at the same speed, being mounted on the same shaft, and must work under the same net head, it is impossible in such a multi-runner arrangement to obtain a speed for the lowest runner corresponding to its location with respect to tailwater, and there is no connection between its position and its speed as required by this invention.

Not only does the method of this invention provide a means for greatly increasing the specific speeds of turbine for any given head, but it also enables turbines of given specific speeds to be operated at much higher heads than are used in present practice. Present practice is based on the erroneous assumption that the degree of specific speed which can be used depends on the net head on the plant. This is only true when the practice is adhered to of placing the runner at an arbitrary height above tailwater. The method now in use by hydraulic engineers for determining the leading factors in a power plant design is to plot a curve, based on accepted practice, between specific speed and net head on the plant, and, as soon as the available net head is known for any new development, to select from such a curve the specific speed to be used. Such a curve as described, however, does not represent any true relation, since it is plotted between two variables which are not necessarily functions of each other. The permissible specific speed does not depend on the net head on a plant, but upon the pressure-head $h_{Pd}$ beneath the runner. As long as this pressure-head is not allowed to fall to within an unduly small margin of absolute zero, the runner may be as safely used under higher heads as under low. As much margin in pressure ($h_{Pd}$) may be provided in any case as may be considered desirable by placing the runner at a sufficiently low elevation with respect to tailwater, the distance required being computed by solving formula ($b$) for $H_2$.

To illustrate this point, let us consider the use of a runner of $N_s=82$ having 30% outflow loss, when applied to various heads. Present practice would confine the use of such a runner to heads lower than about 50 ft. The possibilities opened up by this invention in the case of such a turbine are shown in the diagram (Fig. 7) which gives the elevation $H_2$ of the runner discharge with respect to tailwater which would enable the same turbine to be used under a wide range of heads. This curve is plotted from formula ($b$) transposed:

$$H_2 = e_d \zeta_d H - h_{at} + h_{Pd} \quad \text{---------} (g)$$

The assumed values are as follows:

$$e_d = 0.80; \; \zeta_d = 0.30; \; h_{at} = 34 \text{ ft.}$$

$h_{Pd}$ has been increased so as to allow greater margin for higher heads, 10 ft. being provided at 100 ft. and 15 ft. at 200 ft. This has been done to take care of greater variations in pressure when the velocities are higher, and to give additional insurance against corrosion of the metal of the turbine under the higher heads. The formulæ from which the curves have been plotted are:

$$h_{Pd} = 5 + .05H$$

and $$H_2 = 0.8 \times 0.3H - 34 + 5 + .05H = .29H - 29$$

or $$H_2 = 29\left(\frac{H}{100} - 1\right).$$

To compare the possibilities indicated by these curves with present practice, consider the turbine represented as applied to a head of 200 ft. By placing the runner 29 ft. below the tailwater surface a specific speed of 82 can be realized. For a head of 200 ft. present practice dictates specific speeds not higher than 40, so that the specific speed and correspondingly the actual speed of a turbine can be more than doubled by this method. For example, if a turbine similar to that here considered is built in such a size as to deliver 40,000 H. P. under 200 ft. head, the speed in accordance with present practice would be limited to 150 revolutions per minute, but by the method here outlined can be raised to 300 R. P. M. or higher. This will very greatly reduce the cost of both the turbine and electrical generator and will effect economies in carrying out a power development. The increase in speed just outlined need not involve any sacrifice in efficiency.

Referring to formula ($c$) it will be noted that the velocity with which the runner discharges into the draft tube is properly a function of $H_2$, and is not a function of $H$, the net head. The velocity which can be employed at the discharge from the runner is therefore independent of the net head on the turbine, and for a given atmospheric pressure and a given allowance for the absolute pressure in the draft tube, this velocity is dependent only on the location of the runner with respect to tailwater. It should also be noted that the actual location of the turbine runner should be fixed by measuring $H_2$ called for by formula ($g$) from the elevation of low tailwater in a plant in which the tailwater level is subject to variation at different stages of the river and under different conditions of operation of the plant. It will therefore be necessary in some cases to place the runner at a somewhat greater depth below normal tailwater than the value called for by the formula. Whenever a siphon draft tube is used it will also be necessary in plants subject to variations in tailwater level to place the lower wall of the siphon at its crest at an elevation equal to or slightly higher than the highest tailwater expected for the plant, and the discharge end of the siphon must be carried a sufficient distance below the low tailwater level to insure the siphon remaining sealed under all conditions of operation.

In some cases and particularly with the inverted form of turbine the draft tube may have a straight tapered portion interposed between the runner discharge and the spread portion to axially elongate the tube and accommodate a deeper setting of the runner. By the system of this invention a wide range of speeds is available for the turbine and by the adoption of increased speeds, the entire installation may be reduced in size and cost. In many low-head developments this first cost is the really determinative consideration; the problem is not to develop the greatest amount of power possible from the full flow of the river, but is to develop some power as economically as possible. In many such cases, it will pay to allow some water to go to waste, if the rest can be unitized economically. In many cases, efficiency will not be a ruling consideration if rotary speeds for the turbines and generators can be increased to values which will enable cheaper machines to be used. In such cases the system of this invention affords a direct and practicable solution of the problem and makes available power hitherto altogether lost.

In this specification, "tailwater" means the elevation of the surface of the tailrace. "Static discharge head" means the difference in height of tailwater and point of discharge of runner ($H_2$) plus the head corresponding to the pressure of the atmosphere. "Discharge pressure" and "discharge pressure head" mean the absolute pressure and pressure head at the point of discharge of the runner with reference to absolute vacuum as zero. By "continuity of the water column" is meant that the intake, turbine and draft tube passages during operation remain filled with water forming a continuous column through these passages from head water to tailwater without interruption at any section.

I claim:—

1. A system for converting hydraulic power into mechanical power comprising means for passing water through a turbine runner and discharging it therefrom at a velocity so related to the static discharge head on the runner that the absolute discharge pressure on the runner is only sufficient to insure continuity of the water column.

2. A system for converting hydraulic power into mechanical power comprising means for passing water through a turbine runner and discharging it therefrom at a velocity so related to the static discharge head on the runner that the absolute discharge pressure on the runner is only sufficient to insure continuity of the water column, and a draft tube passing said water from said runner into a tailwater having its surface at a level higher than said runner.

3. A system for converting hydraulic power into mechanical power comprising means for flowing water in a continuous column from a supply source to a lower tailwater, means carrying the intermediate flow below the level of said tailwater, and means passing said intermediate flow through a turbine runner having a single discharge at a velocity head high in comparison with the net head on the plant.

4. A system for converting hydraulic power into mechanical power by the flow of water from head water to tailwater, comprising a turbine having a runner, means for passing the water from head water to said runner so that at said runner it will have a velocity head high in comparison with the net head between head water and tailwater, and means receiving the outflow from said runner and converting velocity head of the flow into pressure head so as to lower the back pressure on said runner to a relatively low absolute pressure.

5. A system for converting hydraulic power into mechanical power by the flow from head water to tail water, comprising a turbine having a runner, means for passing the water from head water to said runner so that at said runner it will have a velocity head high in comparison with the net head between head water and tail water, and means receiving the outflow from said runner and converting velocity head of the flow into pressure head so as to lower the back pressure on said runner to a relatively low absolute pressure and so that the turbine runner operates at a difference of head between entrance and discharge which is high as compared with the head on the plant.

6. A system for converting hydraulic power into mechanical power by the flow of water from head water to tailwater comprising a turbine having a runner, a conduit passing the flow from head water to and through the runner and discharging the outflow from said runner with the velocity head high in comparison with the pressure head of the atmosphere, and a draft tube for converting said velocity head into pressure head so as to lower the back pressure on said runner to a relatively low absolute pressure.

7. A system for converting hydraulic power into mechanical power by the flow of water from head water to tailwater comprising a turbine having a runner, a conduit passing the flow from head water to and through the runner and discharging the outflow from said runner with the velocity head high in comparison with the pressure head of the atmosphere, and a draft tube for converting said velocity head into pressure head so as to lower the back pressure on said runner to a relatively low absolute pressure, the velocity head of the outflow from said runner being greater than the velocity head corresponding to the elevation of the runner above tailwater so that the greater portion of the vacuum in the draft tube is due to velocity head and a lesser portion to static elevation above tailwater.

8. A system for converting hydraulic power into mechanical power comprising means for passing water at relatively high velocity through a turbine runner having a single discharge and a draft tube converting the velocity of said discharge into effective pressure head at the tailwater, said tailwater having its level higher than said runner.

9. A system for increasing the rotary speed of a hydraulic turbine comprising a turbine at a low elevation relatively to tailwater, said turbine having a high discharge velocity head compared to the net head on the plant and said velocity head being so related to the static discharge head that the absolute discharge pressure is only sufficient to insure continuity of flow so that the runner will operate at the speed corresponding to the difference between the initial head and the absolute discharge pressure head.

10. A system for increasing the rotary speed of a hydraulic turbine comprising a turbine runner placed at a low elevation with respect to tail water and having the flow through said runner upward, the runner being so designed and placed that the discharge velocity head from said runner is high compared to the net head on the plant and said velocity head being so related to the static discharge head that the absolute discharge pressure is only sufficient to insure continuity of flow, and water passage to and from said runner adapted to operate the runner under the head equal to the difference between the initial head and the absolute discharge pressure head.

11. A system for converting hydraulic power into mechanical power comprising means for guiding water from a supply source through a runner having a single discharge to a point at a lower level and increasing the velocity of flow at said lower level, and discharging the outflow from said runner through a velocity head regaining draft tube into tailwater having a surface level above said runner.

12. A system for converting hydraulic power into mechanical energy comprising means for passing water through a turbine runner having a single discharge, discharging the outflow from said runner through a velocity head regaining draft tube into tailwater having its surface at higher level than said runner, the back pressure on the outflow from said runner being sufficient to maintain the continuity of the water column.

13. In a hydraulic turbine system having a runner and a headwater and tailwater, a conduit between said headwater and tailwater, the portion of said conduit between the runner and the tailwater comprising a draft tube receiving the discharge from said runner and so disposed with reference to said tailwater that the absolute static discharge head at the point of highest velocity is large in comparison with the net head on the plant, the flow being passed into said draft tube with a discharge velocity head sufficient to reduce the discharge pressure to only enough to insure continuity of flow.

14. In a hydraulic turbine system having a runner and a headwater and tailwater, a conduit between said headwater and tailwater, the portion of said conduit between the runner and the tailwater comprising a draft tube receiving the discharge from said runner and so disposed with reference to tailwater that the absolute static discharge head is large in comparison with the net head on the plant, and having a discharge velocity head from the runner sufficient to reduce the discharge pressure to only enough to insure continuity of flow; said turbine being operated at a speed corresponding to the initial head minus the discharge pressure head.

15. In a hydraulic power system having a supply source, a turbine runner at a lower level receiving water from said source and a tailwater having its level between said runner and said source, and a draft tube between said runner and said tailwater and adapted to reduce the back pressure to just enough to maintain the continuity of the water column between said source and said tailwater.

16. In a hydraulic power system having a turbine runner with a single discharge and a tailwater at higher level than said runner, a draft tube between said runner and said tailwater and adapted to convert velocity head of said runner discharge into effective pressure head.

17. In a hydraulic power system having a turbine runner and a head water and tailwater above the level of said runner, a conduit connecting one of said waters with said runner and having a crest rising above the level of the water with which it is connected to form a siphon.

18. In a hydraulic power system having a turbine runner and a head water and tailwater above the level of said runner, conduits connecting said waters with said runner and each having a crest rising above the level of its corresponding water to form a siphon.

19. In a hydraulic power system having a turbine runner and a head water and tailwater above the level of said runner, a conduit connecting one of said waters with said runner and having a crest rising above the level of the water with which it is connected to form a siphon, and an air outlet connected to said siphon.

20. A system for converting hydraulic power into mechanical power comprising means for passing water upward through a single discharge turbine runner, and means for discharging the outflow from said runner into tailwater having its level above said runner comprising a velocity head regaining draft tube.

21. In a hydraulic power system having a head water and tailwater and a single discharge turbine runner below the level of said tailwater, means for passing the flow from said head water upward through said runner and discharging it into said tailwater comprising a velocity head regaining draft tube.

22. In a hydraulic power system the combination with a single discharge turbine runner, of means for passing water through said runner and discharging it upward therefrom, and means for discharging said water into tailwater having its level above said runner comprising a velocity head regaining draft tube.

23. In a hydraulic power system the combination with a turbine runner, of means for passing water through said runner and discharging it upward therefrom, means for discharging said water into tailwater having its level above said runner, and carrying said discharge above the level of the tailwater to form a siphon.

24. In a hydraulic power system, the combination with an upwardly discharging turbine runner, of means for discharging the water therefrom, comprising an upwardly directed barrel from the top of which the water discharges outwardly through a cylindrical opening.

25. In a hydraulic power system, the combination with an upwardly discharging turbine runner, of means for discharging the water therefrom, comprising an upwardly directed barrel from the top of which the water discharges through a cylindrical opening, said barrel extending above the level of the tailwater.

26. In a hydraulic power system, the combination with an upwardly discharging turbine runner, of means for discharging the water therefrom, comprising an upwardly directed barrel from the top of which the water discharges through a cylindrical opening discharging into a space which finally discharges below tailwater.

27. In a hydraulic power system having a headwater and a tailwater the combination with a turbine runner near the level of the tailwater and a conduit for passing the water through said runner comprising a velocity reducing draft tube discharging into said tailwater and reducing the absolute discharge pressure on the runner to a value only sufficient to maintain the continuity of the water column through said runner.

28. A system for converting hydraulic power into mechanical power comprising a turbine runner and means for directing water through said runner under an intake head greater than the head at tailwater level and discharging it from the runner with a velocity head in excess of twenty five per cent of the head on the turbine, the runner being so positioned with respect to tailwater level that the static discharge head overcomes the pressure reduction in the runner discharge due to said high velocity of flow and insures continuity of the water column, and means for operating the runner at a speed corresponding to the difference between the intake head and the discharge pressure head.

29. The combination with a turbine runner having the flow passing upwardly through it and adapted to operate at a high speed in comparison with the speed corresponding to the net head on the power plant, and means for delivering the flow from said runner at correspondingly high velocity, and a draft tube gradually decelerating the outflow so as to regain a large portion of the discharge velocity head from said runner.

30. The combination with a turbine runner located below the tailwater level and adapted to operate at high speed in comparison with the speed corresponding to the net head on the power plant, of means for delivering the flow from said runner at correspondingly high velocity, and a draft tube gradually decelerating the outflow so as to regain a large portion of the discharge velocity head from said runner.

31. The combination with a turbine runner having the flow passing upwardly through it and adapted to operate at high speed in comparison with the speed corresponding to the net head on the power plant, and means for delivering the flow from said runner at correspondingly high velocity of whirl, and a spreading draft tube adapted to gradually decelerate the outflow so as to regain the energy of both the whirling and meridian components of flow.

32. In a hydraulic power system the combination with a single discharge turbine runner, of means for passing water therethrough comprising a passage extending below tailwater level passing over a crest higher than tailwater and then discharging below tailwater level.

33. In a hydraulic power system having provision for a headwater and tailwater, a single-runner single discharge turbine having a runner discharging upwardly into a velocity head regaining draft tube discharging below tailwater.

34. In a hydraulic turbine the combination with a single discharge runner, of a velocity head regaining draft conduit comprising an entrance portion receiving the flow from the runner, a chamber receiving the flow from said entrance portion and having its upper surface above the level of tail water, and an outlet portion discharging the flow and having its upper surface extending below the tail water level so as to permit a pressure below atmospheric in said chamber.

35. In a hydraulic turbine the combination with a single discharge runner, of a velocity head regaining draft conduit comprising an entrance portion receiving the flow from the runner, a chamber receiving the flow from said entrance portion and having its upper surface above the level of tail water, an outlet portion discharging the flow and having its upper surface extending below the tail water level so as to permit a pressure below atmospheric in said chamber, and means for exhausting air from said chamber.

36. In a hydraulic turbine the combination with a runner, of a draft conduit comprising an axially directed entrance portion receiving the flow from the runner, a chamber surrounding the outlet end of said entrance portion receiving the flow from said entrance portion and having its upper surface above the level of tail water, and an outlet portion discharging the flow and having its upper surface extending below the tail water level so as to permit a pressure below atmospheric in said chamber.

37. In a hydraulic turbine the combination with a runner, of a draft conduit comprising an axially directed entrance portion receiving the flow from the runner, a chamber surrounding the outlet end of said entrance portion and extending axially around said outlet toward said runner receiving the flow from said entrance portion and having its upper surface above the level of tailwater, and an outlet portion discharging the flow and having its upper surface extending below the tail water level so as to permit a pressure below atmospheric in said chamber.

38. In a hydraulic turbine the combination with a runner, of a draft conduit comprising an upwardly directed entrance portion receiving the flow from the runner, a chamber surrounding the outlet end of said entrance portion receiving the flow from said entrance portion and having its upper surface above the level of tail water, and an outlet portion discharging the flow and having its upper surface extending below the tail water level so as to permit a pressure below atmospheric in said chamber.

39. In a hydraulic power system the combination with provisions for head water and tail water having between them a net head of over fifty feet, of a turbine having a single discharge runner located near or below the level of the tailwater, turbine passages for passing the flow through the turbine from head water to tail water without break in water column and comprising an intake passage and a draft tube passage for converting the velocity head of the flow into pressure head so as to lower the back pressure on the runner, said runner and turbine passages forming a turbine unit having a specific speed of over 100.

40. In a hydraulic machine, a rotor, a continuous wall forming a conduit extending above the lower portion of and surrounding said rotor, and means forming a liquid sealed chamber extending above and below the upper end of said wall.

41. In a hydraulic machine, a rotor, a continuous wall forming a conduit extending above the lower portion of and surrounding said rotor, means forming a liquid sealed chamber above said wall, and a liquid basin communicating with said chamber only below the top of said wall.

42. In a hydraulic machine, a rotor having an axis of rotation, a wall extending entirely around said axis above the lower portion of said rotor, said wall forming a conduit communicating with said rotor, and means forming a liquid sealed chamber located above said wall and extending below the exterior thereof.

43. In a hydraulic machine, a rotor having a vertical axis of rotation, a wall completely surrounding said axis and forming a conduit communicating with the top of said rotor, means forming a sealed chamber extending laterally from said axis and beyond said wall, and a liquid basin communicating with said chamber at the exterior and below the top of said wall.

44. In a hydraulic machine, a rotor having a vertical axis of rotation, an annular wall completely surrounding said axis and extending upwardly from the lower portion of said rotor, said wall forming a conduit communicating with the top of said rotor, means forming a sealed conduit directed toward the axis of said rotor above the top of said wall, and a liquid basin communicating with said sealed conduit below the top of the exterior of said wall.

45. In a hydraulic machine, a rotor having a vertical axis of rotation, an annular wall completely surrounding said axis and extending upwardly from the lower portion of said rotor, said wall forming a conduit directed along the axis of said rotor, means forming a sealed annular conduit directed toward the axis of said rotor and extending downwardly beyond the periphery of said wall, and a liquid basin communicating with said downwardly extending conduit portion below the top of said wall.

46. In a hydraulic machine, a rotor having a vertical axis of rotation, a wall surrounding and extending above the lower portion of said rotor, said wall forming a conduit communicating with said rotor, means forming a sealed chamber above said wall, and means for removing air from said chamber.

47. In a hydraulic machine, a rotor having a vertical axis of rotation, a wall completely surrounding said axis and extending above the lower portion of said rotor to form a conduit communicating with said rotor, means forming a sealed chamber above said wall, a liquid basin communicating with said chamber below the top of the exterior of said wall, and means for removing air from said chamber.

48. In a hydraulic machine, a rotor, a continuous wall extending entirely above and forming a conduit communicating with said rotor, means forming a sealed chamber extending below the upper end of the exterior of said wall, and means for removing air from said chamber.

49. In a hydraulic machine, a pair of liquid basins located at different elevations, means forming a conduit directed toward the lower of said basins and extending entirely above the upper of said basins, and a rotor located in said conduit.

50. In a hydraulic machine, a pair of liquid basins having different elevations, means forming a sealed conduit having its one end immersed in the liquid of the lower of said basins and the upper end of said conduit having sealed communication with the liquid level in the upper of said basins, a rotor in said conduit, and means for removing air from said conduit to establish a flow of liquid through said rotor.

51. In a hydraulic machine, a rotor having a vertical axis of rotation, and means forming an open vertical flow decelerating conduit within which said rotor is located, the upper end of said conduit communicating with a liquid basin and the wall of said conduit forming a continuous crest extending above the level of the liquid in said basin to permit drainage of liquid from said conduit without permitting flow of liquid from said basin into said conduit.

52. In a hydraulic machine, a rotor having a vertical axis of rotation, means forming an open vertical flow decelerating conduit within which said rotor is located, and means forming a liquid basin in which the liquid level is maintained below the top opening of said conduit.

53. In a hydraulic machine, a rotor having a vertical axis of rotation, and means forming a conduit surrounding said axis above said rotor, said conduit being formed to decelerate liquid delivered from said rotor, and a liquid basin below the upper extremity of said conduit but communicable with said conduit extremity by siphon action during operation of said rotor.

54. In a hydraulic machine, a rotor having a vertical axis of rotation, means forming a liquid basin surrounding said axis above said rotor, and means forming a flow decelerating conduit extending entirely above the level of the liquid in said basin and adapted to gradually decelerate the liquid delivered from said rotor.

55. In a hydraulic machine, a rotor, a trumpet shaped casing forming a flow decelerating conduit communicating with said rotor, and a liquid basin through which said casing extends, said casing forming an annular continuous crest extending above the level of the liquid in said basin.

56. The combination with a turbine of a vertical flow draft tube and a water sealed vacuum chamber into which the draft tube discharges.

57. The combination with a turbine having a vertical flow draft tube of a chamber larger in area than the draft tube, said chamber having a curtain wall below the level of the water in the tail race.

58. The combination with a turbine having a vertical flow draft tube of a vacuum chamber into which said tube extends, the discharge area of said chamber increasing for a portion of its vertical dimension.

59. The combination with a turbine having a vertically extending draft tube of a vacuum chamber, and means to exhaust the air from said chamber whenever necessary.

60. The combination with a turbine and its draft tube of a vacuum chamber extending above the level of the bottom of the draft tube.

61. The combination with a turbine having a vertically extending draft tube of a vacuum chamber disposed above the level of the bottom of the draft tube, the discharge area of said chamber being greater at one point than another.

62. The combination with a turbine and a vertically extending draft tube of a vacuum chamber, said chamber extending upwardly from the draft tube and being of increasing cross-sectional area from one point to another, and means to exhaust the air from said chamber when necessary.

HARVEY BIRCHARD TAYLOR.